United States Patent Office 3,317,403
Patented May 2, 1967

3,317,403
STREPTOMYCES AUREOFACIENS FERMENTATION PROCESS USING GLYCERIDE OIL AND CASEIN
Stephen Aloysius Szumski, Pearl River, N.Y., assignor to American Cyanamid Company, Stamford, Conn., a corporation of Maine
No Drawing. Filed Feb. 10, 1964, Ser. No. 343,488
6 Claims. (Cl. 195—80)

This invention relates to a novel fermentation process and more particularly is concerned with an improved fermentation process and medium therefor for the production of the tetracycline antibiotics.

In the past, many attempts have been made to increase the yields of the tetracycline antibiotics produced by the microorganism *Streptomyces aureofaciens* by fermentation media containing various substances which have generally been referred to in the past as additives. Typical of such additives are various glyceride oils. The use of a typical glyceride oil, such as lard oil, for example is disclosed in my United States Patent No. 3,012,946. Lard oil has also been used in such fermentations as a defoaming agent. However, in the past the use of a glyceride oil has resulted in a loss in total antibiotic production. The present invention is based upon the surprising discovery that the addition of a glyceride oil, such as lard oil, when dispersed in an aqueous suspension of casein is added to a fermentation medium, a definite increase in the yield of the resulting tetracycline antibiotic is obtained. In other words, it has been discovered that casein in combination with a glyceride oil for example exerts a definite synergistic effect upon the total antibiotic production. It is not known why such is the case and no theory is advanced with respect thereto as will be evident from a consideration of the detailed specification which follows and the exemplary disclosures, however, it is a demonstrable fact that a synergistic effect is produced by the conjoint use of lard oil and casein.

Typical glyceride oils which may be used in practicing the present invention include oils such as lard oil, corn oil, peanut oil, cottonseed oil, soybean oil, olive oil, sperm oil, palm oil, whale oil and the like. In other words, I may use the typical glyceride oils of the prior art and preferably such oils are used in an amount ranging from 1% to 7% by volume.

The amount of casein that is usefully added to the medium ranges from 1 to 10 grams per liter of medium. If desired, the casein-glyceride oil combination may be added at the same time as the rest of the fermentation media is being prepared.

The conditions of the fermentation are generally the same as for the presently known methods for producing tetracycline, chlortetracycline and demethyltetracycline by fermentation. In other words, the fermentative biosynthesis of these antibiotics are carried out by appropriate selection of suitable strains of *Streptomyces aureofaciens* as is well known to the art. Thus, the fermentation medium contains the usual nutrients and mineral substances. Suitable nutrient substances include starch, dextrose, cane sugar, glucose, molasses, soybean meal, peanut meal, yeast, meat extracts, peptone, ammonium sulfate, urea, corn steep liquor, distillers' solubles, inorganic salts and other conventional substances. The inorganic salts include such things as calcium carbonate, ammonium sulfate, ammonium chloride and various trace elements such as manganese, cobalt, zinc, copper, iron and the like. Generally, it is preferred to use a medium rich in chloride ion also as higher yields of the chlorinated antibiotics are thereby obtained.

The other general conditions of the fermentation such as hydrogen ion concentration, temperature, time, rate of aeration, preparation of the inoculum, sterilization, inoculation and the like are conventional and may be similar to those for the production of chlortetracycline shown in United States patent to Duggar, No. 2,482,055, for the production of tetracycline shown in the United States patent to Minieri et al., No. 2,734,018, and for the production of demethylchlortetracycline shown in the United States patent to McCormick et al., No. 2,878,289.

The recovery of chlortetracycline, tetracycline and demethylchlortetracycline from the fermentation liquor is conventional and need not be described as numerous methods for recovering these tetracycline antibiotics from fermentation liquors have already been published.

The invention will be described in greater detail in conjunction with the following specific examples.

EXAMPLE 1.—SYNERGISTIC EFFECT OF LARD OIL DISPERSED IN CASEIN ON A 7-CHLOROTETRACYCLINE FERMENTATION

Spores of a 7-chlorotetracycline producing strain of *Streptomyces aureofaciens* were washed from a streaked agar slant with sterile distilled water to form a suspension containing $(60-80)10^6$ spores per milliliter.

A 0.33 milliliter portion of this suspension was used to seed eight inch shaker tubes containing 8 milliliters of a medium prepared according to the following formulation:

| | |
|---|---|
| Sucrose | grams__ 30.0 |
| Corn steep liquor | milliliters__ 16.5 |
| Calcium carbonate | grams__ 7.0 |
| Ammonium sulfate | do____ 2.0 |
| Tap water qs. to 1000 milliliters. | |

Prior to seeding, the medium was sterilized by autoclaving for twenty minutes under a pressure of 15 pounds per square inch. The seeded shaker tubes were then incubated for 24 hours at 28° C. on a reciprocating shaker operating at 116 oscillations per minute.

A series of fermentation media were prepared. In each medium the basic ingredients were the same. The only variables were the percentages of lard oil and casein. The basic ingredients and the various concentrations of lard oil and casein were as follows:

*Basic media ingredients*

| | Grams |
|---|---|
| Starch | 55.0 |
| Corn steep liquor | 20.0 |
| $CaCO_3$ | 10.0 |
| $(NH_4)_2SO_4$ | 7.0 |
| $MnSO_4$ | 0.15 |
| $NH_4Cl$ | 2.0 |
| Corn flour | 14.5 |
| Tap water qs. to 1000 milliliters. | |

*Media variables*

| Medium | Percent Lard Oil | Casein Concentration, grams/liter |
|---|---|---|
| A | 0 | 0 |
| B | 2.0 | 0 |
| C | 3.0 | 0 |
| D | 0 | 5 |
| E | 2.0 | 5 |
| F | 3.0 | 5 |

Twenty-five milliter aliquots of these media were placed in a series of 250 milliliter Erlenmeyer flasks, closed in each case with a cotton plug, sterilized in an autoclave for twenty minutes at 15 pounds per square inch pressure and cooled to room temperature. The flasks were then fermented at 25° C. for 72 hours, at which time the harvest mash in each flask was assayed for 7-chlorotetracycline content. The results appear in Table I below:

TABLE I

| Percent Lard Oil | No Casein, percent | 5 gm./liter Casein, percent | Calculated Additive Effect, percent | Actual Effect, percent |
|---|---|---|---|---|
| 0 | 100 | 100 | 0 | 0 |
| 2 | 176 | 192 | 76 | 92 |
| 3 | 250 | 266 | 150 | 166 |

Medium A containing no casein and no lard oil was used as the basis for 100% recovery. The test results of the other media were calculated against the results of Medium A. Thus it can be seen that the addition of casein (5 gm./liter) had no effect upon the results. The addition of 2% lard oil but no casein gave an increase of 76%. In the presence of 5 gm./liter of casein the increase was augmented to 92%, this being 16% more than the sum of the individual increases due to lard oil and casein if their effects were additive. Similarly, 3% lard oil and 5 gm./liter of casein gave an increase of 166%, which is 16% more than the expected effect if the increase from lard oil and casein were additive.

EXAMPLE 2.—SYNERGISTIC EFFECT OF LARD OIL DISPERSED IN CASEIN ON A 7-CHLORO-6-DEMETHYLTETRACYCLINE FERMENTATION

The procedure of Example 1 was followed except that a strain of *S. aureofaciens* capable of producing 7-chloro-6-demethyltetracycline was used and the basic fermentation medium was composed as follows:

| | Parts |
|---|---|
| Cottonseed meal | 30 |
| Barley flour | 35 |
| Brewer's yeast | 1 |
| $NH_4Cl$ | 1 |
| $CuSO_4$ | 0.05 |
| Water qs. to 1000. | |

The results appear in Table II.

TABLE II

| Percent Lard Oil | No Casein, percent | 5 gm./liter Casein, percent | Additive Effect Calculated, percent | Actual Effect, percent |
|---|---|---|---|---|
| 0 | 100 | 111 | 11 | 11 |
| 2 | 248 | 279 | 159 | 179 |
| 3 | 318 | 358 | 229 | 258 |

Medium A containing no casein and no lard oil was used as the basis for 100% recovery. The test results of the other media were calculated against the results of Medium A. Thus it can be seen that the addition of casein (5 gm./liter) increased the potency by 11%. The addition of 2% lard oil but no casein gave an increases of 148%. In the presence of 5 gm./liter of casein, the increase was augmented to 179%. This was 20% more than the sum of the individual increases due to lard oil and casein, if their effects were additive. Similarly, 3% lard oil dispersed in 5 gm./liter of casein gave an actual increase of 258%, 29% more than the expected effect if the increase from lard oil and casein were additive.

I claim:
1. In a process of producing tetracycline antibiotics by aerobic fermentation of an aqueous nutrient medium by microorganisms of the species *Streptomyces aureofaciens*, the improvement which comprises supplying to said medium from about 1% to 7% by volume of a glyceride oil and from about 1 to 10 grams of casein per liter of medium.

2. In a process of producing chlortetracycline by aerobic fermentation of an aqueous nutrient medium by microorganisms of the species *Streptomyces aureofaciens*, the improvement which comprises supplying to said medium from about 1% to 7% by volume of a glyceride oil and from about 1 to 10 grams of casein per liter of medium.

3. In a process of producing tetracycline by aerobic fermentation of an aqueous nutrient medium by microorganisms of the species *Streptomyces aureofaciens*, the improvement which comprises supplying to said medium from about 1% to 7% by volume of a glyceride oil and from about 1 to 10 grams of casein per liter of medium.

4. In a process of producing demethylchlortetracycline by aerobic fermentation of an aqueous nutrient medium by microorganisms of the species *Streptomyces aureofaciens*, the improvement which comprises supplying to said medium from about 1% to 7% by volume of a glyceride oil and from about 1 to 10 grams of casein per liter of medium.

5. In a process of producing demethyltetracycline by aerobic fermentation of an aqueous nutrient medium by microorganisms of the species *Streptomyces aureofaciens*, the improvement which comprises supplying to said medium from about 1% to 7% by volume of a glyceride oil and from about 1 to 10 grams of casein per liter of medium.

6. A process according to claim 1 in which the glyceride oil is lard oil and in which it is dispersed in an aqueous suspension of the casein.

References Cited by the Examiner

UNITED STATES PATENTS

| 2,763,591 | 9/1956 | Hatch et al. | 195—80 |
| 2,776,243 | 1/1957 | McGhee et al. | 195—80 |
| 2,911,339 | 11/1959 | Goodman | 195—80 |

A. LOUIS MONACELL, *Primary Examiner.*

D. M. STEPHENS, *Assistant Examiner.*